US007766298B2

(12) United States Patent
Chang et al.

(10) Patent No.: US 7,766,298 B2
(45) Date of Patent: Aug. 3, 2010

(54) APPARATUS FOR POSITIONING AN IMAGE MEASURING PLATFORM

(75) Inventors: Chih-Kuang Chang, Taipei Hsien (TW); Sen Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 542 days.

(21) Appl. No.: 11/849,303

(22) Filed: Sep. 3, 2007

(65) Prior Publication Data

US 2008/0128576 A1 Jun. 5, 2008

(30) Foreign Application Priority Data

Dec. 1, 2006 (CN) ........................ 2006 1 0201189

(51) Int. Cl.
*F16M 11/04* (2006.01)
*A63B 21/06* (2006.01)
*A61G 13/00* (2006.01)
*A47C 20/02* (2006.01)

(52) U.S. Cl. ......................... 248/424; 248/429; 482/98; 482/83; 482/135; 5/623; 5/648; 367/99; 367/128

(58) Field of Classification Search ................. 248/424, 248/429, 444.1, 445; 428/98, 83, 135; 5/623, 5/524, 648, 646; 367/99, 128; 198/403, 198/409
See application file for complete search history.

(56) References Cited

U.S. PATENT DOCUMENTS 4,391,360 A * 7/1983 Minnetti ..................... 198/412
5,458,312 A * 10/1995 Goldberg ................. 248/444.1
5,606,534 A * 2/1997 Stringer et al. .............. 367/128
6,142,288 A * 11/2000 Hotkowski et al. .......... 198/409
6,191,848 B1 * 2/2001 Armitage .................... 356/213
6,249,342 B1 * 6/2001 Cheng ..................... 356/237.2
6,298,009 B1 * 10/2001 Stringer ....................... 367/99
6,298,507 B1 * 10/2001 Clyburn ......................... 5/623

(Continued)

*Primary Examiner*—Sang Nguyen
(74) *Attorney, Agent, or Firm*—Frank R. Niranjan

(57) ABSTRACT

An apparatus for positioning an image measuring platform, the apparatus includes a horizontal base (11); a measuring platform (21) movable on the horizontal base; a support arm (12) extending in the Z-axis direction secured to the horizontal base; two parallel sliders (435) extending in the Z-axis direction fixed on the upper ends of the support arm; a first bar (411) for controlling the measuring platform to move in X-axis direction; a second bar (421) for controlling the measuring platform to move in Y-axis direction; a first cantilever (314) and a second cantilever (315) vertically attached on the two parallel sliders; a charge coupled device lens (31) fixed on the first cantilever and the second cantilever through a lens clamp (312) and a locking cap (313); a first screw handle (414) engaged with the holes of both sides of a first bracket (413) secured on the horizontal base, a first male screw thread (415) formed outside the first screw handle, and a first female screw thread (416) corresponding to the first male screw thread formed outside the first bar; and a second screw handle (424) engaged with the holes of both sides of a second bracket secured (423) on the horizontal base, a second male screw thread (425) formed outside the second screw handle, and a second female screw thread (426) corresponding to the second male screw thread formed outside the second bar.

6 Claims, 5 Drawing Sheets

U.S. PATENT DOCUMENTS 6,600,808 B2 7/2003 Takada et al.
6,937,463 B2 * 8/2005 Chung et al. ................ 361/607
2008/0002967 A1 * 1/2008 Chapman .................... 396/428

* cited by examiner

APPARATUS FOR POSITIONING AN IMAGE MEASURING PLATFORM

BACKGROUND OF THE INVENTION

1. Field of the Invention

The present invention is related to an apparatus for positioning an image measuring platform.

2. Description of Related Art

An image measuring apparatus is a device that uses a CCD lens for capturing images of objects, which is placed on a measuring platform of the image measuring apparatus.

A conventional apparatus for positioning an image measuring platform includes a measuring platform for placing objects, and a moving device for moving the measuring platform. However, this conventional apparatus has disadvantages. For example, the moving device could not precisely move the measuring platform to target positions for the lack of a position device.

Accordingly, what is needed is an apparatus for positioning an image measuring platform, which can precisely move the measuring platform to target positions and adequate for high-precision measurement.

SUMMARY OF THE INVENTION

One preferred embodiment provides an apparatus for positioning an image measuring platform. The apparatus includes a horizontal base; a measuring platform movable on the horizontal base; a support arm extending in the Z-axis direction secured to the horizontal base; two parallel sliders extending in the Z-axis direction fixed on the upper ends of the support arm; a first bar for controlling the measuring platform to move in X-axis direction; a second bar for controlling the measuring platform to move in Y-axis direction; a first cantilever and a second cantilever vertically attached on the two parallel sliders; a charge coupled device lens fixed on the first cantilever and the second cantilever through a lens clamp and a locking cap; a first screw handle engaged with the holes of both sides of a first bracket secured on the horizontal base, a first male screw thread formed outside the first screw handle, and a first female screw thread corresponding to the first male screw thread formed outside the first bar; and a second screw handle engaged with the holes of both sides of a second bracket secured on the horizontal base, a second male screw thread formed outside the second screw handle, and a second female screw thread corresponding to the second male screw thread formed outside the second bar.

Other systems, methods, features, and advantages will be or become apparent to one skilled in the art upon examination of the following drawings and detailed description.

DETAILED DESCRIPTION OF THE INVENTION

The image measuring apparatus includes a supporting system, a working platform system, an imaging system, and a moving system.

Figure 1:
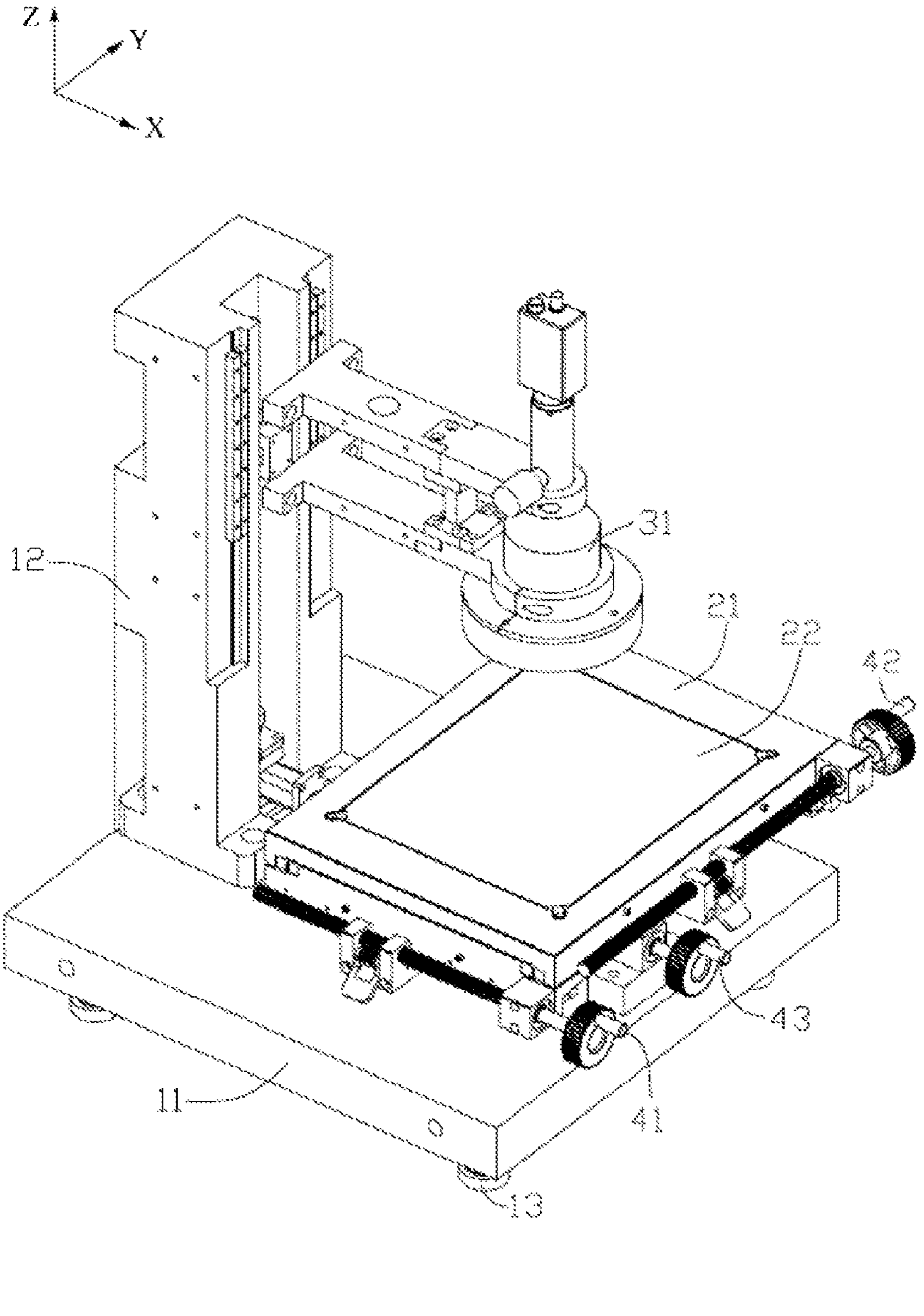
FIG. 1 is a perspective view showing the entire arrangement of an image measuring apparatus in accordance with one preferred embodiment.

Referring to FIG. 1. The supporting system includes a horizontal base 11 and a support arm 12 extending in the Z-axis direction secured on the middle of one side of the horizontal base 11. Several feet 13 are attached on the underside of the horizontal base 11. The material used for creating the horizontal base 11 may be marble or metal.

The working platform system includes a measuring platform 21 that movable on top of the horizontal base 11 and a glass pane 22 that is attached on the center portion of the measuring platform 21. The glass pane 22 is configured for placing objects to be measured.

Figure 2:
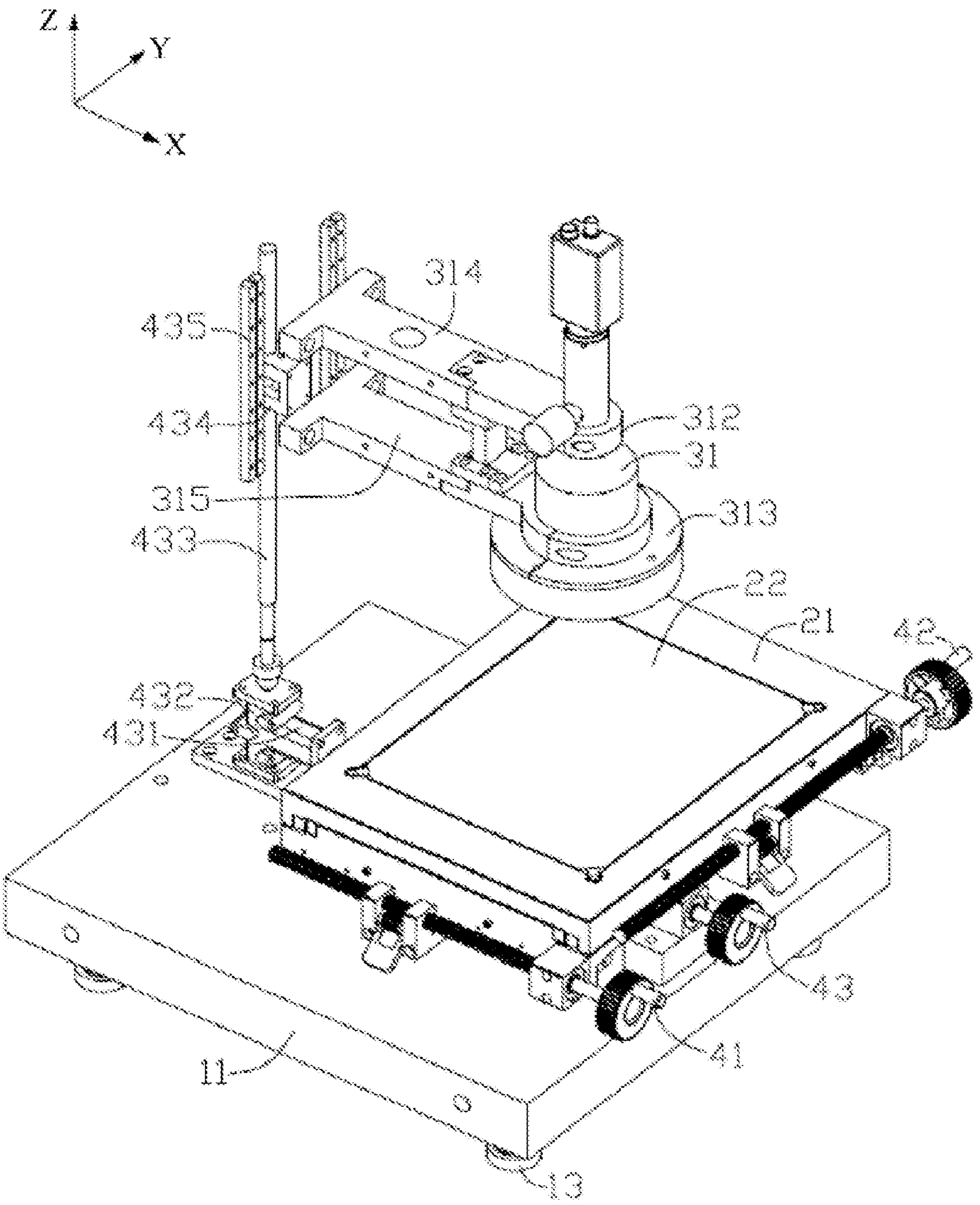
FIG. 2 is a perspective view showing the internal structure of the image measuring apparatus in FIG. 1.

Referring to FIG. 2. The imaging system includes two parallel sliders 435 extending in the Z-axis direction fixed on the upper ends of the support arm 12, a first cantilever 314, a second cantilever 315, a lens clamp 312 fixed on one end of the first cantilever 314, a locking cap 313 fixed on one end of the second cantilever 315, and a charge coupled device (CCD) lens 31, the upper ends and the lower ends of the CCD lens 31 are fixed separately on the lens clamp 312 and the locking cap 313. The other end of the first cantilever 314 and the other end of second cantilever 315 are vertically attached to the support arm 12 and moves relative to the two parallel sliders 435. The first cantilever 314 and the second cantilever 315 are parallel, and capable of sliding up and down the two parallel sliders 435, which further move the CCD lens 31 in the Z-axis direction. The CCD lens 31 is vertical to the measuring platform 21 in Z-axis direction.

Figure 3:
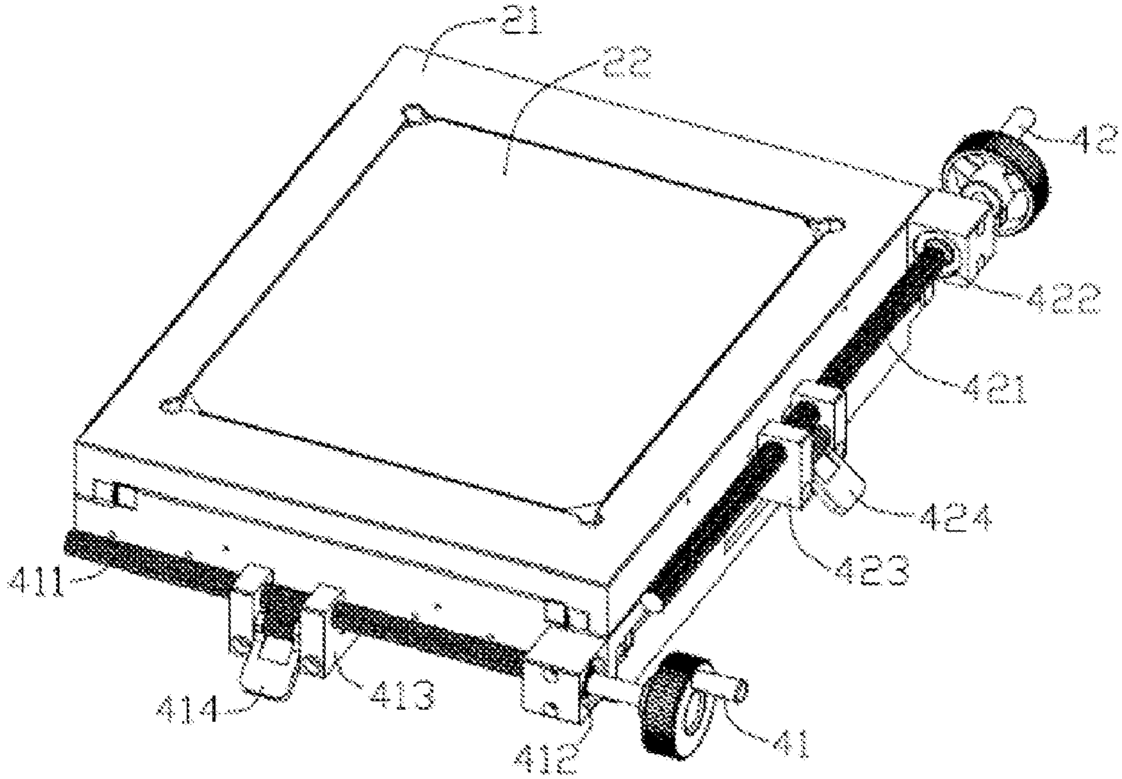
FIG. 3 is a perspective view showing an apparatus for positioning an measuring platform.
Figure 4:
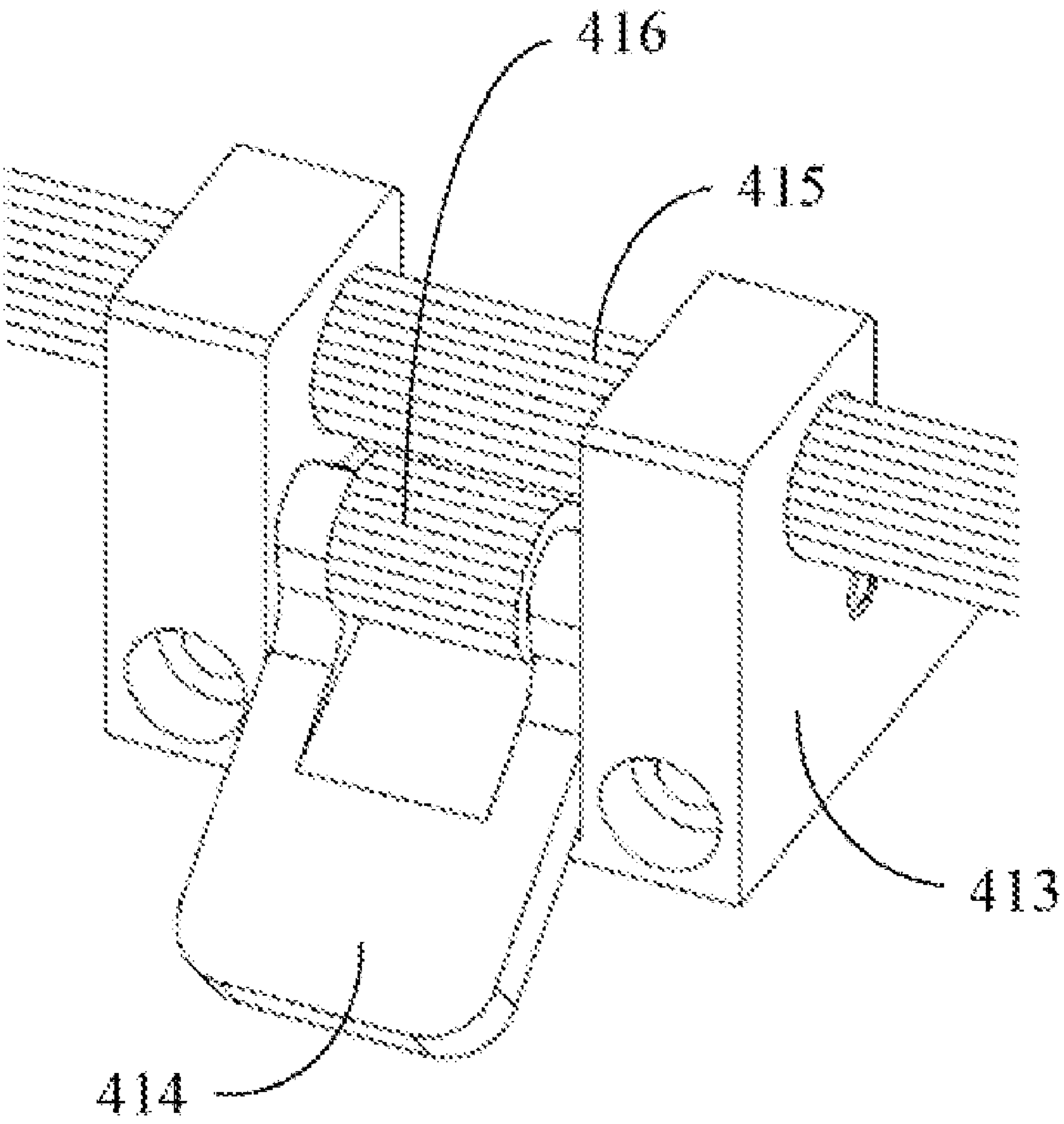
FIG. 4 is a perspective view showing the apparatus for positioning the measuring platform in X-axis in FIG. 3.
Figure 5:
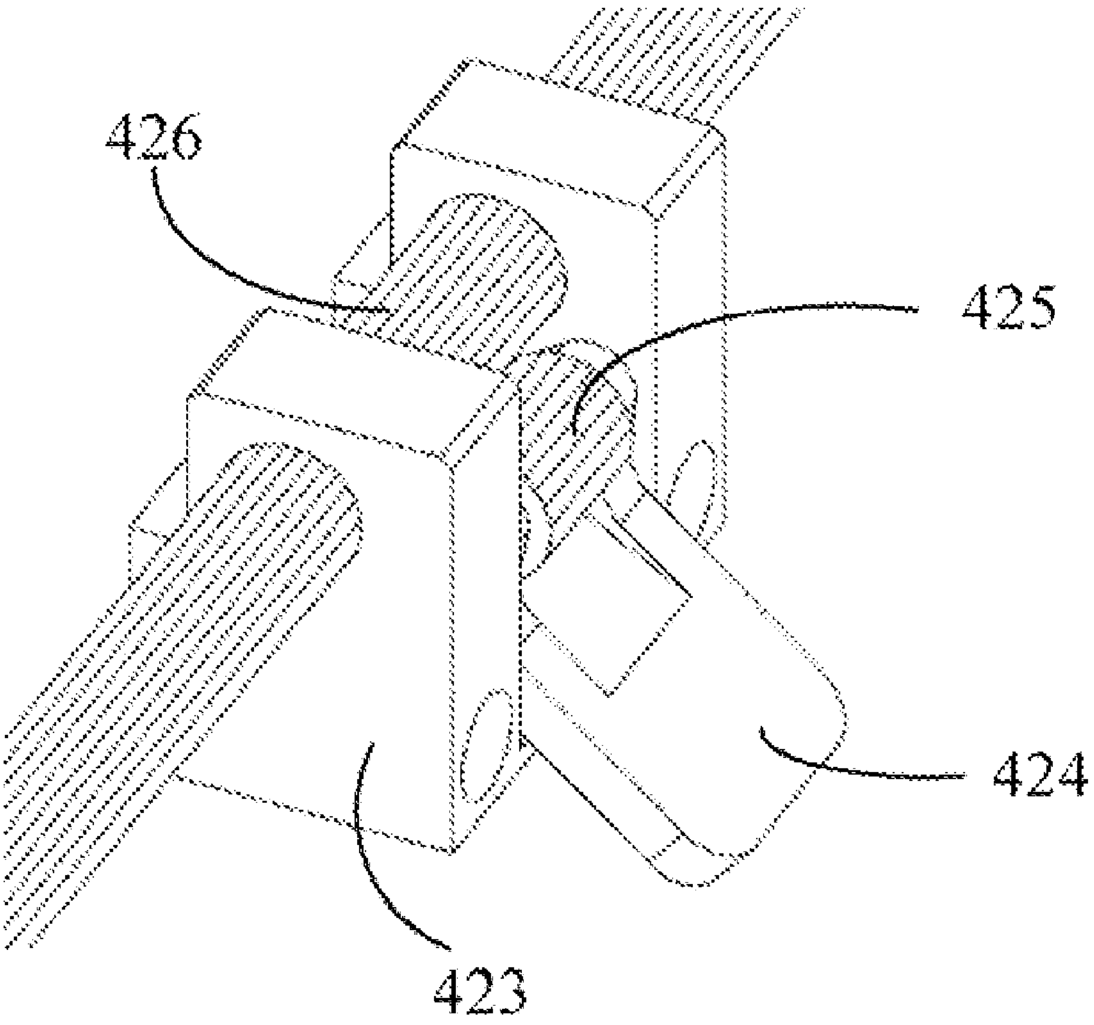
FIG. 5 is a perspective view showing the apparatus for positioning the measuring platform in Y-axis in FIG. 3.

Referring to FIG. 3, FIG. 4, and FIG. 5. The moving system includes an X-axis moving system for controlling the measuring platform 21 to move in the X-axis direction, a Y-axis moving system for controlling the measuring platform 21 to move in the Y-axis direction, and a Z-axis moving system for controlling the CCD lens 31 to move in the Z-axis direction. The X-axis moving system includes a first operating handwheel 41, a first bar 411, a first bearing 412, a first bracket 413, and a first screw handle 414. The first operating handwheel 41 is attached on one end of the first bar 411. The first bar 411 is placed in X-axis direction. The first bearing 412 is attached on one side of the measuring platform 21 and is placed to partially surround one end of the first bar 411, next to the first operating handwheel 41. The first bracket 413 is secured on the center portion of one side of the horizontal base 11 and is placed to partially surround the first bar 411. The first screw handle 414 is engaged with the holes of both sides of the first bracket 413. A first male screw thread 415 is formed outside the first screw handle 414, and a first female screw thread 416 corresponds to the first male screw thread 415 is formed outside the first bar 411. The Y-axis moving system includes a second operating handwheel 42, a second bar 421, a second bearing 422, a second bracket 423, and a second screw handle 424. The second operating handwheel 42 is attached on one end of the second bar 421. The second bar 421 is placed in Y-axis direction. The second bearing 422 is attached on another side of the measuring platform 21 and is placed to partially surround one end of the second bar 421, next to the second operating handwheel 42. The second bracket 423 is secured on the center portion of another side of the horizontal base 11 and is placed to partially surround the second bar 421. The second screw handle 424 is engaged with the holes of both sides of the second bracket 423. A second male screw thread 425 is formed outside the second screw handle 424, and a second female screw thread 426 corresponds to the second male screw thread 425 is formed outside the second bar 421. The Z-axis moving system includes a third operating handwheel 43, a third bar 431, a redirector 432, a wheelwork 433, and a third bearing 434. The third operating handwheel 43 is attached on one end of the third bar 431. The third bar 431 is placed in X-axis direction. The redirector 432 is fixed on the other end of the third bar 431. The wheelwork 433 is opposing to the horizontal base 11 in Z-axis direction. One end of the wheelwork 433 is fixed on the redirector 432. The third bearing 434 is placed to partially surround the other end of the wheelwork 433 and attached on the end of the first cantilever 314 and the second cantilever 315 that is attached on the two parallel sliders 435.

Once the first screw handle 414 is pressed down, the first male screw thread 415 formed outside the first screw handle 414 is threadably screwed into the first female screw thread 416 formed outside the first bar 411. And the first operating handwheel 41 can be rotated by force, in which drives the first bar 411 and the first bearing 412 to rotate and further micro-moves the measuring platform 21 in X-axis direction. Otherwise, if the first screw handle 414 is drawn up, the first male screw thread 415 formed outside the first screw handle 414 is unscrewed with the first female screw thread 416 formed outside the first bar 411. And the first operating handwheel 41 can be pulled and pushed by force to further fast move the measuring platform 21 on X-axis direction.

Once the second screw handle 424 is pressed down, the second male screw thread 425 formed outside the second screw handle 424 is threadably screwed into the second female screw thread 426 formed outside the second bar 421. And the second operating handwheel 42 can be rotated by force, in which drives the second bar 421 and the second bearing 422 to rotate and further micro-moves the measuring platform 21 in Y-axis direction. Otherwise, if the second screw handle 424 is drawn up, the second male screw thread 425 formed outside the second screw handle 424 is unscrewed with the second female screw thread 426 formed outside the second bar 421. And the second operating handwheel 42 can be pulled and pushed by force to further fast move the measuring platform 21 on Y-axis direction.

When the third operating handwheel 43 is rotated by force, the third bar 431 rotates relatively to the operating handwheel 43, which forces the redirector 432, the wheelwork 433 and the third bearing 434 to rotate, and then the third bearing 434 forces the first cantilever 314 and the second cantilever 315 slide up and down the two parallel sliders 435 to further move the CCD lens 31 on Z-axis direction.

It should be emphasized that the above-described embodiments of the preferred embodiments, particularly, any preferred embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. An apparatus for positioning an image measuring platform, the apparatus comprising:

a horizontal base;

a measuring platform movable on the horizontal base;

a support arm extending in the Z-axis direction secured to the horizontal base;

two parallel sliders extending in the Z-axis direction fixed on the upper ends of the support arm;

a first bar for controlling the measuring platform to move in X-axis direction;

a second bar for controlling the measuring platform to move in Y-axis direction;

a first cantilever and a second cantilever vertically attached on the two parallel sliders;

a charge coupled device lens fixed on the first cantilever and the second cantilever through a lens clamp and a locking cap;

a first screw handle engaged with the holes of both sides of a first bracket secured on the horizontal base, a first male screw thread formed outside the first screw handle, and a first female screw thread corresponding to the first male screw thread formed outside the first bar; and a second screw handle engaged with the holes of both sides of a second bracket secured on the horizontal base, a second male screw thread formed outside the second screw handle, and a second female screw thread corresponding to the second male screw thread formed outside the second bar.

2. The apparatus according to claim 1, wherein the first bar is attached to the measuring platform through a first bearing, and the second bar is attached to the measuring platform through a second bearing.

3. The apparatus according to claim 1, when the first male screw thread formed outside the first screw handle is threadably screwed into the first female screw thread formed outside the first bar, the measuring platform is micro-moved in the Y-axis direction by rotating the first bar.

4. The apparatus according to claim 1, when the second male screw thread formed outside the second screw handle is threadably screwed into the second female screw thread formed outside the second bar, the measuring platform is micro-moved in the Y-axis direction by rotating the second bar.

5. The apparatus according to claim 1, when the first male screw thread formed outside the first screw handle is unscrewed with the first female screw thread formed outside the first bar, the measuring platform is fast moved on X-axis direction by pulling and pushing the first bar.

6. The apparatus according to claim 1, when the second male screw thread formed outside the second screw handle unscrewed with the second female screw thread formed outside the second bar, the measuring platform is fast moved on X-axis direction by pulling and pushing the second bar.

* * * * *